May 21, 1935.  E. A. JOHNSTON ET AL  2,002,205
HARVESTER THRESHER
Original Filed Oct. 14, 1926  4 Sheets-Sheet 1

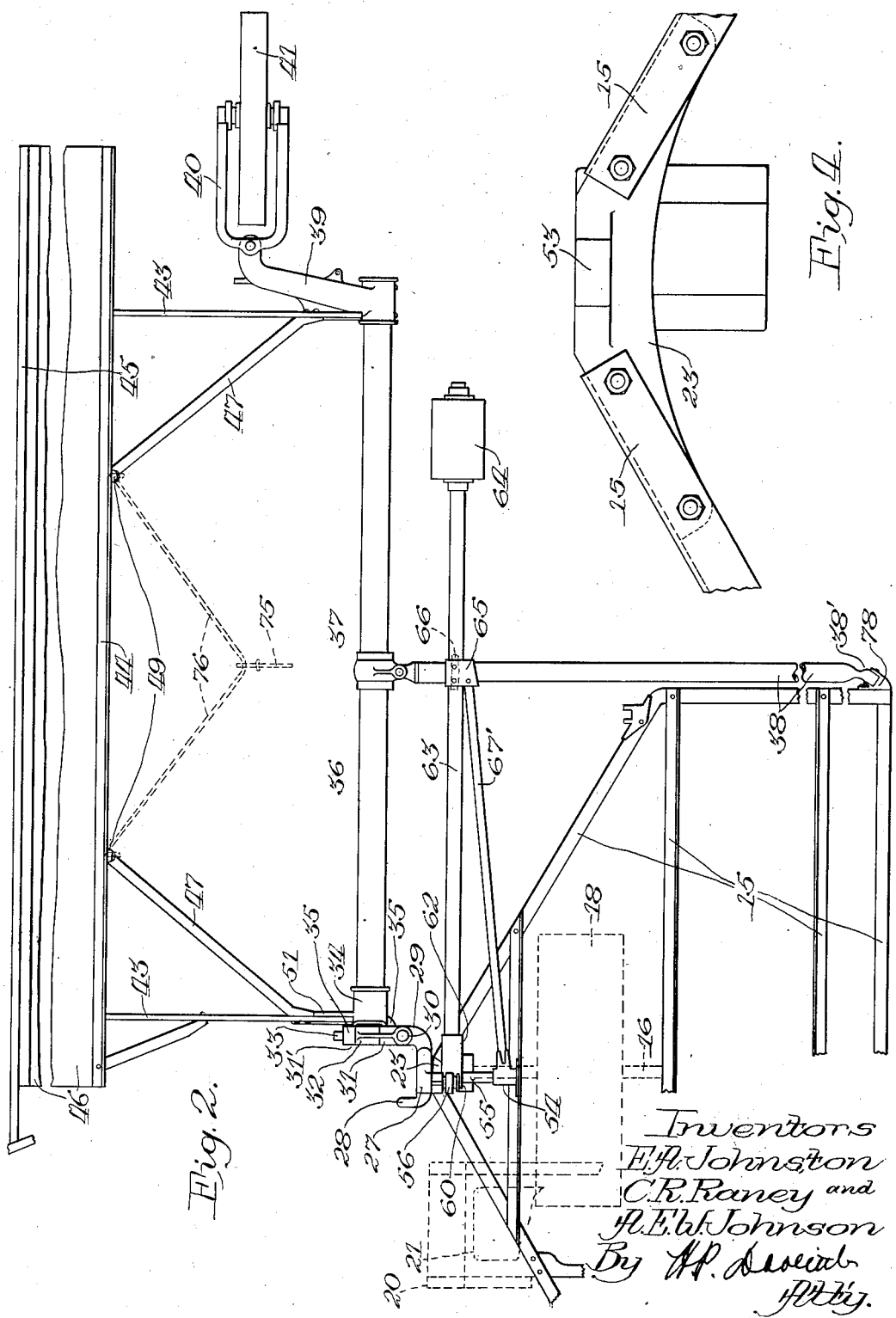

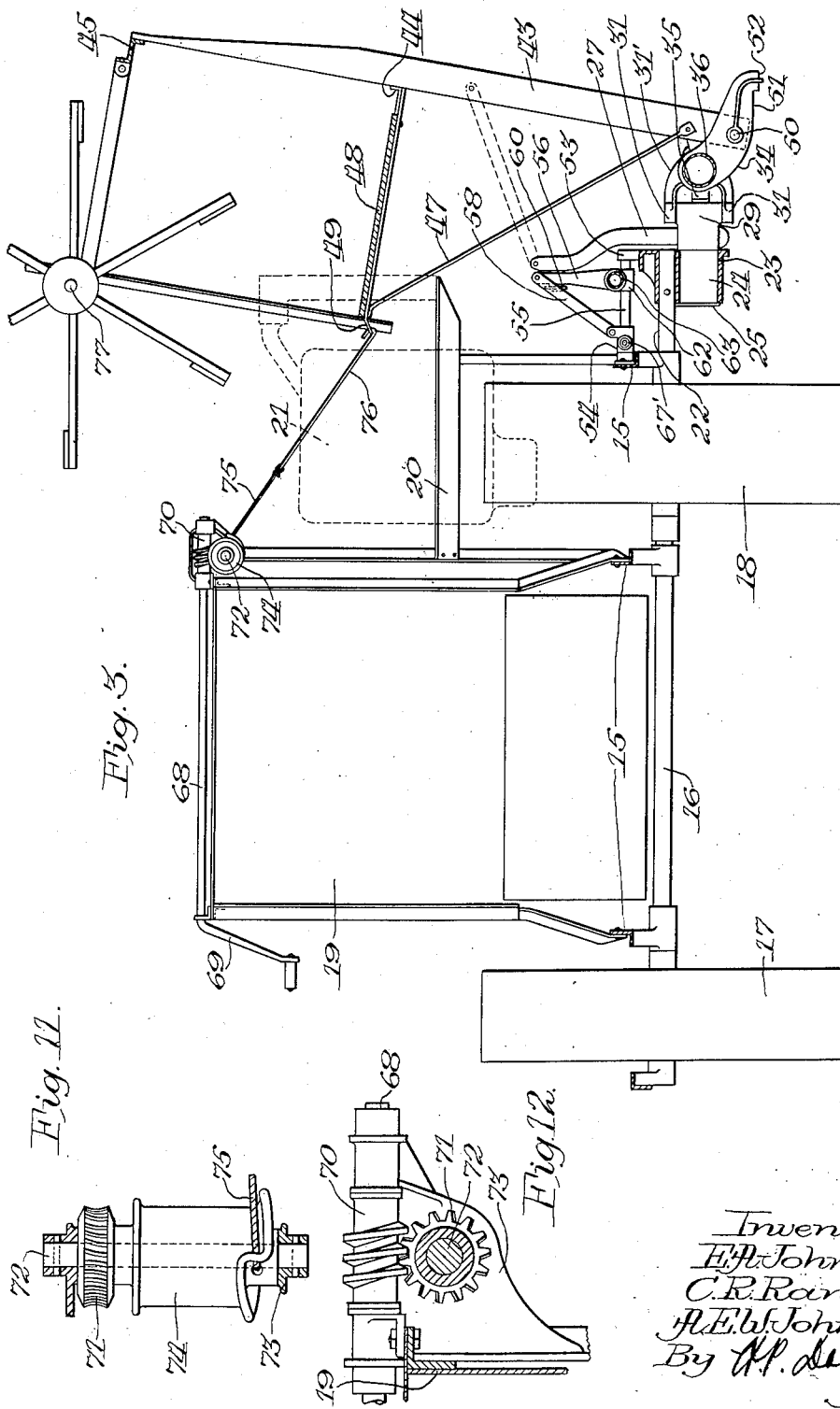

May 21, 1935.   E. A. JOHNSTON ET AL   2,002,205
HARVESTER THRESHER
Original Filed Oct. 14, 1926   4 Sheets-Sheet 4
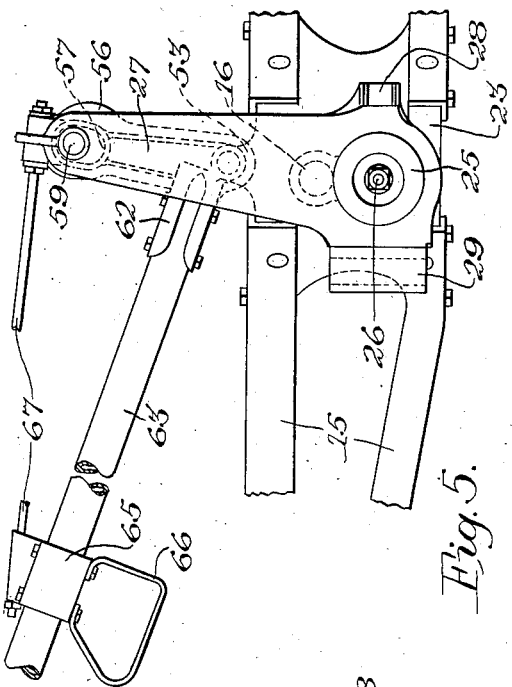
Fig. 5.
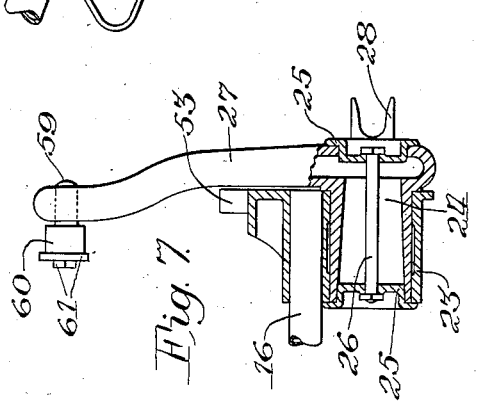
Fig. 7.
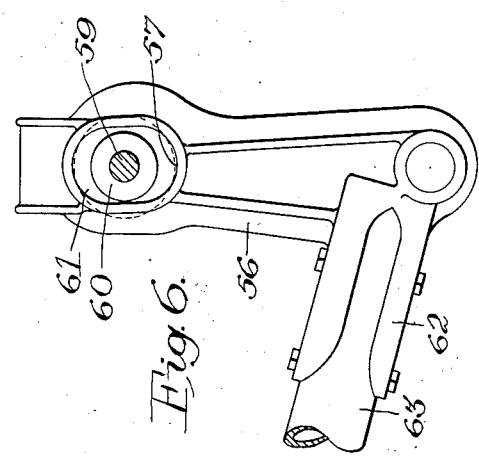
Fig. 6.
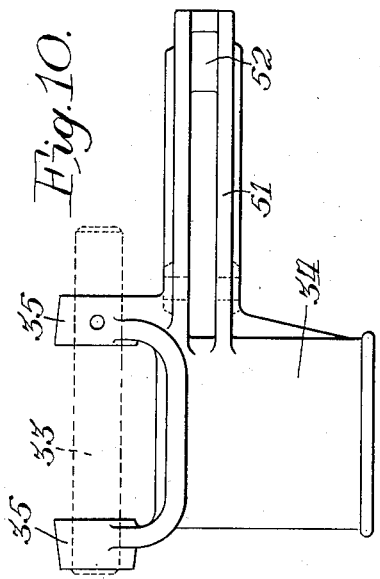
Fig. 10.
Fig. 9.
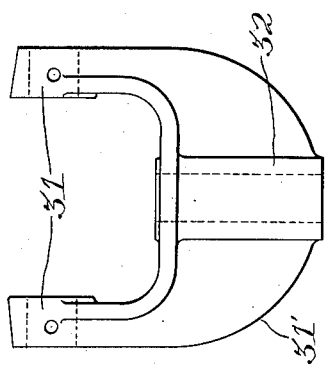
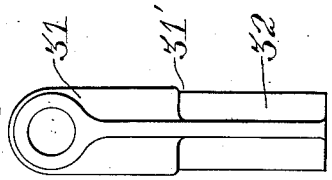
Fig. 8.
Inventors
E. A. Johnston
C. R. Raney and
R. E. W. Johnson
By
Atty.

Patented May 21, 1935

2,002,205

UNITED STATES PATENT OFFICE 2,002,205

HARVESTER THRESHER

Edward A. Johnston, Chicago, Clemma R. Raney, Riverside, and Arnold E. W. Johnson, Chicago, Ill., assignors to International Harvester Company, Chicago, Ill., a corporation of New Jersey Original application October 14, 1926, Serial No. 141,449. Divided and this application June 8, 1933, Serial No. 674,916. Renewed August 13, 1934

27 Claims. (Cl. 56—20)

This invention is in the art of harvester threshers and it relates especially to means for facilitating transportation of such machines through narrow places and over narrow highways.

This application is a division of our pending application Serial No. 141,449, filed October 14, 1926, now Patent No. 1,948,921, dated February 27, 1934.

As is well known in this art, these harvester threshers comprise a thresher part and a laterally offset harvester part, which latter part embodies a vertically adjustable header platform. These header platforms in the larger machines cut a swath of considerable width, usually not less than twelve feet. As a consequence, the overall width of these machines is so great that transportation of the same through narrow places, such as gateways, and over narrow roads cannot be accomplished without first removing the entire header platform, or by folding said platform rearwardly alongside the thresher part or body of the machine. These alternatives, however, in standard machines are not easy of accomplishment because the header platform must be counterbalanced to make vertical adjustments thereof easy when cutting. The platform is supported on an axle member in these machines, the platform extending forwardly of the axle while the counterbalance, in the form of one or more weighted arms, extends rearwardly of such axle. Thus, if the header platform were completely removed, the counterbalance would also have to be removed; while the folding method could likewise not be achieved without disturbing the counterbalancing mechanism.

The folding platform idea in practice is preferable and the problem is to provide such an arrangement which is operable without disturbing the counterbalancing means.

The primary object is to provide means for folding the platform back alongside the thresher body in a horizontal plane and then to swing the platform upwardly in a vertical position, thereby additionally lessening the width of the machine materially.

Another object is to accomplish such folding action without disturbing the counterbalance means.

Other objects will be apparent to those skilled in this art as the present description progresses:

These very desirable objects are accomplished, briefly, in the provision of a harvester thresher embodying a thresher part and a laterally offset harvester part, said harvester part comprising a header platform carried on an axle so constructed and arranged as to permit the same to rock on its axis, float up and down on its pivot, and fold backwardly alongside the thresher part on another pivot. The rocking movement is balanced by a counterbalancing means located on the thresher part, but operable in its counterbalancing action entirely independent of said thresher. Therefore, as this counterbalance is carried on the thresher part, obviously the harvester part can be folded back for transport without in any way disturbing or interfering with said counterbalance. Additional means is provided for raising the platform up in a vertical plane after it has been folded back.

Reference should now be made to the accompanying sheets of drawings showing an illustrative embodiment which this invention may assume in practice. In the drawings the same characters of reference denote like parts throughout the views, and—

Figure 2 is a similar view but showing the harvester part in its horizontal folded position;

Figure 3 is a rear view of the harvester thresher showing the harvester part in its vertically folded position;

Figure 4 is a detail view of the frame construction;

Figure 5 is a side elevational detail view, showing the mounting of the counterbalancing means;

Figure 6 is a detail view of a part of the counterbalancing means;

Figure 7 is a similar detail view, partly in section, viewing a right angle part of the structure shown in Figure 5;

Figures 8, 9 and 10 are respectively detail views of the castings forming the two-way hinge for the harvester support or axle; and, Figures 11 and 12 are respectively plan and side detail views of the windlass used for raising the harvester part up vertically alongside the thresher to its final folded position for transport.

Figure 1:
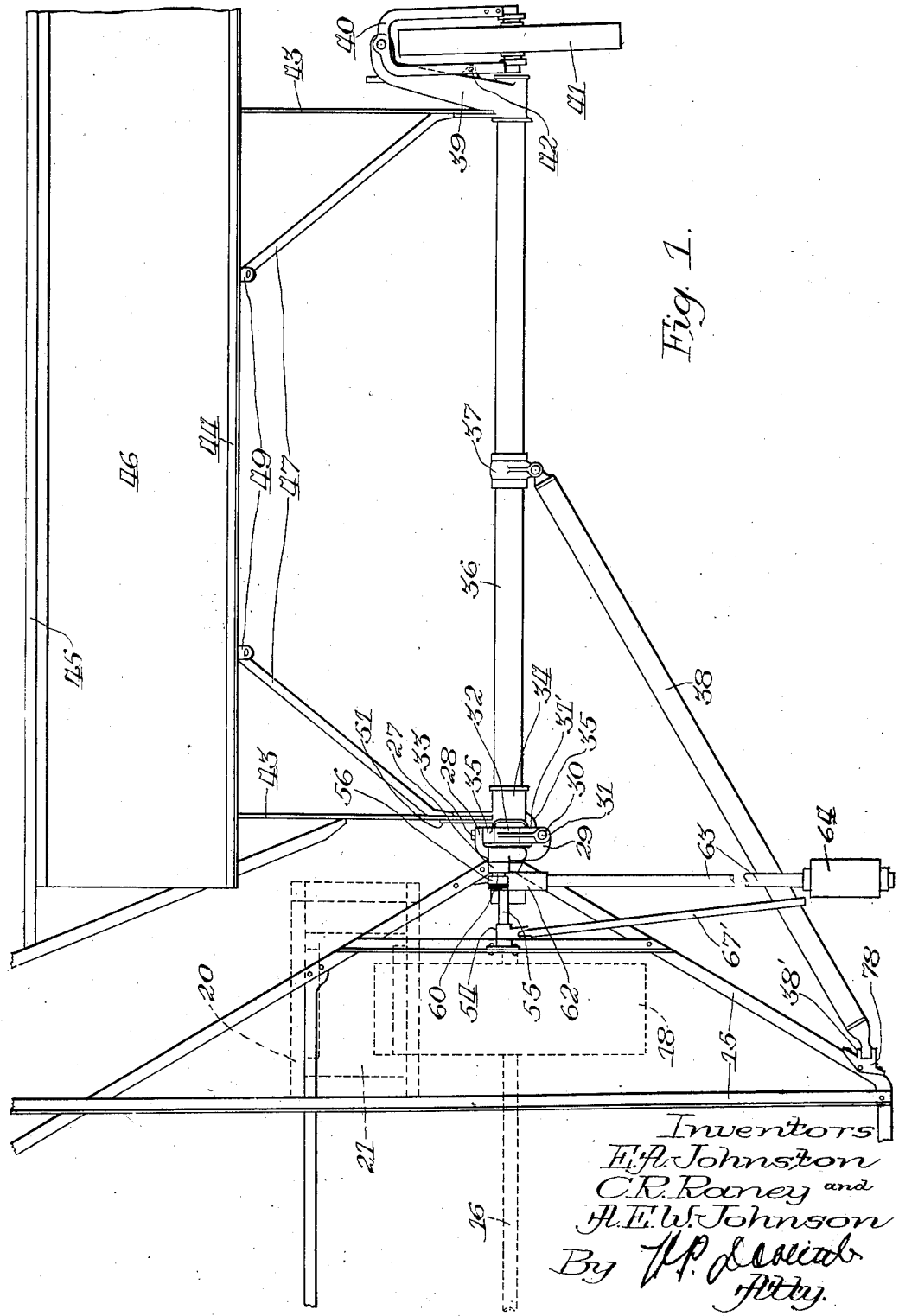
Figure 1 is a plan view of so much of a harvester thresher as is necessary to a disclosure of this invention, and in this view the harvester part is shown in normal cutting position.

The thresher part of the harvester thresher of this invention embodies, as shown in Figures 1, 2 and 3, a main frame 15 longitudinally disposed on a main axle or thresher support 16 journaled in a right hand wheel 17 and a left hand wheel 18, as viewed from the front. The axle 16 is stationary and the frame 15 is rigidly carried thereby. As shown particularly well in Figure 3, this main frame 15 rigidly carries the thresher or separator housing 19. Disposed above the left hand wheel 18 and forwardly thereof and above the same, the main frame 15 carries a super-frame structure 20 on which may be mounted an engine 21 generally indicated in Figures 1, 2 and 3, which engine drives the operative parts of the thresher and harvester, as is well known in this art.

In the drawings, and particularly Figure 3, it will be seen that the axle 16 has an extension 22 which extends a substantial distance grainwardly beyond the left hand wheel 18. Suitably keyed or otherwise made fast to the end of this extension 22 is a casting 23 depending below the extension 22 and forming a journal for a grainwardly extending, short stub shaft 24, said stub shaft being rockably mounted in the casting 23 for a purpose presently to appear, (see Figure 7). The stub shaft 24 is hollow and is made fast to the casting 23 by means of end plates 25 locked together by a bolt 26. The construction is such that free rocking movement of the stub shaft 24 is permitted.

The grainward end of the stub shaft 24 beyond the casting 23 is formed integrally with an upstanding arm 27 which, as clearly shown in the drawings, is bent or offset at its upper end in a stubbleward direction. The member 27 carries on its grainward face adjacent its lower end and substantially in line with the bolt 26 at its forward side a horizontally disposed, bifurcated socket 28 and at its back side, a vertically disposed, closed socket 29. The socket 29 is provided with a pin 30, the upper and lower ends of which receive the arms 31 of a bifurcated bracket 31' (see Figures 8 and 9), which bracket is formed with a centrally arranged, right angularly extending bore 32. Passed through the bore 32 is a horizontal pin 33 carried by a second bifurcated casting 34 having arms 35 in which the pin 33 is carried, as shown in Figure 10. The casting 34 has made fast therein a harvester support or axle 36.

It will thus be seen that the harvester support 36, when in the position shown in Figure 1, may freely pivot or float up and down to conform with irregularities in the ground, around a pivot on the pin 33 carried in the arms 35 of the casting 34. In this position a free forward end of the pin 33 engages the bifurcated socket 28 on the front side of the arm 27. The support 36 likewise may be folded back rearwardly alongside the thresher part around the vertical pin 30 as a pivot, which is carried in the vertical socket 29 on the back side of the arm 27.

Intermediately of its length the harvester axle or support 36 is provided with a collar 37 which has pivotally connected thereto, as shown in Figure 1, a normally diagonally and rearwardly extending brace bar 38, which is connected to the main frame 15, as shown at 38', and in this manner, during normal operation, the vertical pin 30 used for folding is held inoperative although rocking movement of the support 36 with the stub shaft 24 and a vertical pivotal movement are permitted, as will be understood.

The grainward end of the support 36 carries a forwardly extending arm 39, at the front end of which is pivotally connected a yoke 40 in which is journaled a grain wheel 41. The yoke 40 is normally locked to the arm 39 by a detachable pin 42, and in this manner the wheel 41 is rigidly held in place to function as a grain wheel. When the harvester thresher is being transported with the harvester part folded back alongside the thresher, as shown in Figure 2, the pin 42 is removed to permit the yoke 40 to swing freely on its pivot and caster.

The castings 34 and 39 on the support 36 each carry a forwardly extending bar 43, the forward ends of which support the usual rear angle bar 44 and the front Z-bar 45 upon which is carried a harvester header platform 46. Diagonal brace members 47 are provided for bracing a back wall 48 for the header platform. Eye hooks 49 are provided on the back board 48 for a purpose later to appear.

The header platform 46, at the forward end of which is carried the usual grain cutting mechanism (not shown), must be raised and lowered so that the height of cut may be varied in accordance with the length of the grain encountered as the harvester thresher travels through the field. In the present embodiment this can be accomplished in any conventional way, such for example as by pulling up or pushing down on the Z-bar 45 by any suitable lever controlled mechanism well known in this art and, therefore, not shown herein. During the cutting operation, the parts are as in Figure 1 with the header platform extending forwardly of the support 36. It will be noted that the stubbleward bar 43 is pivotally connected at 50 to a forward extension 51 of the casting 34, and similarly the stubbleward arm 43 is pivoted to the casting 39. Ledges or rests 52 are provided on these castings 34 and 39 for supporting the arms 43, as is well known in this art.

Because of the great weight of the header platform 46, it would be very difficult manually to raise and lower the same without some form of counterbalancing means. Accordingly, such means has been provided in the present invention, and the same will now be described. Attention is particularly directed to Figures 3, 5, 6 and 7. Above the axle extension 22 of the thresher part, the main frame 15 and the casting 23 are provided with journals 53 and 54 in which is rockably journaled a rockshaft 55. The rockshaft 55 is provided with an upstanding arm 56, the upper end of which is provided with an elongated slot 57, the said arm being rockable with the shaft 55. The upper end of the arm 56 is strengthened by a brace 58 pivoted thereto and to the journal 54. It will be remembered that the arm 27 on the hollow stub shaft 24 extends upwardly and is bent in a stubbleward direction. The purpose of this will now be clear, for it can be seen that the upper end of this arm 27 is provided with a pin 59 on which is freely rotatable a roller 60, which is fitted into the slot 57 of the adjacent arm 56 and is so held in that position by means of a nut and washer 61. The lower end of the arm 56, by means of a socketed casting 62, carries a rearwardly extending arm 63 of substantial length on the rear end of which is carried a heavy weight 64. Intermediately of its length, the arm 63 has formed thereon a collar 65, the lower end of which is provided with a shoe 66 and the upper end of which has connected thereto a brace rod 67, the forward end of which is connected to the upper end of the arm 56 (see Figure 5). A second brace rod 67' extends from the casting 65 to the journal 54 on the rockshaft 55.

When the harvester is in its normal cutting position, as shown in Figure 1, it can now be seen that, if the platform is rocked downwardly, the support 36 will also rock forwardly on its horizontal axis and through the articulated connections described will rock the weighted arm 63 upwardly to counterbalance such a movement of the header platform. In practice, to take care of the torque developed, the support 36 will be in the form of a drawn tube or pipe of high grade steel. Vice versa, when the platform is raised, the support 36 will rock toward the rear on its horizontal axis and the weighted arm 63 will move downwardly to assist elevation of the platform as will now be understood.

When the harvester part is folded rearwardly, as shown in Figure 2, with the platform still remaining in a horizontal plane, the machine has been substantially narrowed in width to assist transportation of the same through narrow places. It has been found desirable, however, additionally to narrow the width of this machine, and accordingly means has been provided for augmenting the folding action by moving the parts from the position shown in Figure 2 to the position shown in Figure 3. For this purpose a shaft 68 is suitably journaled transversely across the top of the separator housing 19, the stubbleward end thereof being provided with a hand crank 69, as shown in Figure 3. The grainward end of the shaft 68 is formed with a worm gear 70, (see Figures 11 and 12), which meshes with a worm pinion 71 on a shaft 72 suitably journaled in a bracket 73 carried on the separator housing. A winding drum 74 can be formed with the pinion 71 or be made fast to the shaft 72, which drum is provided with a cable 75 which is coupled with a hook 76 having legs with upturned ends engageable with the eyes 49 on the braces 47 heretofore described. Thus it will be seen that rotation of the hand crank 69 will wind up the cable 75 and raise the bars 43 on their pivots 59 and thereby vertically swing up the entire header platform from its horizontal position, additionally to narrow the over-all width of the harvester thresher for easier transportation through narrow places. As the superstructure 20 and engine 21 are disposed far enough ahead on the main frame, the header platform when thus folded up in no way conflicts with those elements.

In Figure 3 there is indicated what disposition is made of the harvester reel indicated at 77, and it will be seen that the same is merely disconnected from its driving gearing, not shown, and thus remains in its normal position with respect to the header. Of course, when the harvester part is folded, the weighted arm 63 performs no counter-balancing function and the shoe 66 carried thereby rests on the brace 38 which has been removed from its normal position at its stubbleward end and made fast to another socket indicated at 78 on the stubbleward end of the thresher main frame, shown in Figure 2. It is believed that the operation and use of this invention will be quite clear from the above detailed description and, therefore, only a brief description thereof will be made at this time, as it is thought that such a description should suffice.

In normal operation, the header assumes the position shown in Figure 1 with the grain wheel yoke 40 locked securely to the casting 39. Vertical adjustments of the platform 46 are accomplished in any conventional manner, and its rocking movements with its support 36 are counterbalanced by the weighted arm 63 through the connections between the arms 27 and 56. In this normal cutting position, the support 36 is permitted a free rocking movement with the stub shaft 24 in the casting 23, and similarly the support 36 may rise and fall automatically to conform with irregularities in the ground because of the provision of the horizontal pivot pin 33 for that purpose.

When it is desirable to transport the harvester thresher through narrow places, the stubbleward end of the reel and platform will be disconnected as is conventional in folding machines of this type and the pin 42 is removed to free the yoke 40 from the casting 39, so that the yoke 40 and wheel 41 will swing around and caster freely. The support 36 and with it the platform 46 can now easily be swung through a right angle to the rear about the vertical pin 30 to the position as shown in Figure 2 after first removing the stubbleward end of the diagonal brace pipe 38, as will be understood. With the parts as shown in Figure 2, the brace pipe 38 is made fast to the socket 78 and the weighted balance arm 63, by means of the shoe 66, comes to a position of rest on said brace 38. The wheel 41 is now in a position to function as a trailing caster wheel. This folding operation, it can now be seen, has been accomplished without in any way disturbing the counterbalancing means.

By means of the shaft 68 and the crank 69, and the winding drum operable thereby, it is a simple matter to swing the header supporting bars 43 vertically up with the header to the position shown in Figure 3 and thereby materially lessen the over-all width of the machine additionally.

It is to be understood, of course, that the mechanism herein shown is illustrative of one form which a harvester thresher constructed in accordance with this invention may assume in practice and that the same is susceptible of a great many modifications in structure and that it is the intention to cover such changes as fall within the spirit and scope of this invention as indicated in the following claims.

What is claimed is:

1. In a harvester thresher, a thresher, a harvester connected thereto and normally extending laterally thereof, means adapting the harvester for folding backwardly in a horizontal plane alongside the thresher, and means for then elevating the harvester upwardly to a position above its cutting range.

2. In a harvester thresher, the combination of a thresher part, a harvester part laterally offset with respect to the thresher part and pivotally connected thereto for folding along side the thresher part in a horizontal plane, and means for then folding the harvester upwardly in substantially a vertical plane.

3. In a harvester thresher, a thresher, a harvester connected thereto and normally disposed transversely thereof in a horizontal plane, means adapting the harvester for folding back horizontally, means for then folding the harvester up vertically alongside said thresher, and means for retaining the harvester in such folded position.

4. In a harvester thresher, a thresher, a support, a harvester connected to the support and pivotally connected to the thresher and normally disposed transversely of the thresher in a horizontal plane but foldable backwardly alongside the thresher, and means connected to the thresher at a point higher than the support for elevating the harvester alongside the thresher to obtain additional clearance.

5. In a harvester thresher, a thresher, a harvester foldingly connected thereto whereby the same may be swung in a horizontal plane from its normal transverse cutting position to a position folded alongside the thresher, and a windlass and cable on the thresher for drawing the harvester to an elevated position alongside the thresher to obtain additional clearance.

6. In a harvester thresher, a thresher, a harvester connected thereto and normally disposed transversely thereof in a horizontal plane, counterbalancing means for the harvester, means to permit folding of the harvester back horizontally, and means to cause its elevation to raised position above its cutting range alongside the thresher without disturbing said counterbalancing means.

7. In combination, a thresher, a harvester platform extending transversely thereof, means adapting the platform for folding rearwardly, and means for then folding the platform from the rearward position upwardly alongside said thresher.

8. In a harvester thresher, a thresher part, a harvester part including a platform, the platform being normally extended transversely of the thresher part for cutting position, hinged connections between the harvester part and thresher part permitting the platform to be swung through one plane within its cutting range into a folded position alongside the thresher part to obtain clearance, means for enabling the platform to be moved from its folded position through another plane substantially above and out of its cutting range to obtain additional clearance, and a counterbalance means for the harvester, the above operations being performable without removing said counterbalance means.

9. The combination with a harvester thresher comprising a thresher and a harvester including a platform normally extended transversely into cutting position and adjustable up and down within its cutting range, and releasable means for holding the platform in such normal position, of means connecting the harvester to the thresher for folding movement alongside the thresher upon release of said releasable means to obtain traveling clearance, supporting connections for the platform movable upwardly to carry said platform from its folded position to a position upwardly above its cutting range to obtain additional traveling clearance and a counterbalance means for the platform, said operations being performable without removing the counterbalance means.

10. A machine comprising a thresher, a harvester axle, said axle connected to the thresher for folding to a longitudinal position alongside thereof for traveling clearance, bars pivotally connected to the axle, a platform supported on the bars, said bars normally being substantially horizontally disposed to support the platform in cutting position, said bars being movable upwardly about their pivotal connection to a substantially vertical position to carry the platform into position obtaining additional clearance above its cutting range.

11. A machine embodying a thresher, a harvester comprising a platform normally located in a transverse cutting position at the side of the thresher, support means associated with the thresher and carrying the harvester, said support means with the harvester being foldable from the transverse position to a position alongside the thresher to obtain travel clearance, means whereby the platform may be moved to another position higher than its cutting range to obtain additional clearance, and counterbalance means for the platform, the said clearance obtaining movements being performable without removing the counterbalance means.

12. In combination, a thresher, a normally transverse axle pivotally connected to the thresher, raisable supporting bars connected to the axle, said bars being normally substantially horizontally disposed and carrying a harvester platform, means adapting the axle with the platform for folding rearwardly alongside the thresher, and means exerting a lifting force for then raising the platform supporting bars to a substantially vertical position.

13. In combination, a thresher, a harvester platform extending transversely thereof, means adapting the platform for folding rearwardly, and means exerting a lifting force moving the platform upwardly and inwardly toward the thresher to locate said platform in a higher position than its cutting range.

14. In combination, a thresher, a harvester platform including tiltable supporting bars, said platform in normal position extending transversely of the thresher, means adapting the platform with the supporting bars for folding movement rearwardly, and means for then exerting a lifting force for tilting the supporting bars substantially vertically upwardly to move the platform to an elevated position.

15. In a harvester thresher, the combination with a thresher part, of an axle carrying a harvester platform, said axle connected to the thresher part for folding movement rearwardly to a position alongside the thresher part through a horizontal arc of substantially ninety degrees, and connections pivoted to the axle and carrying the platform, said connections being movable through a vertical arc of substantially ninety degrees to raise the platform to another folded position.

16. In a harvester thresher, in combination, a thresher part, a harvester part including a platform, and a double set of flexible connections intermediate the platform and the thresher part permitting movement of the platform in two angular directions to obtain clearance of the platform to a position substantially above cutting range.

17. In a harvester thresher, in combination, a thresher part, a harvester part including a platform, an axle, and bars supporting the platform and movable with the axle to carry the platform to a clearance position and movable relative to the axle to impart additional clearance to the platform by locating the same in a position substantially above cutting range.

18. In a harvester thresher, in combination, a thresher part, a harvester part, an axle flexibly connected to the thresher part, a platform included in the harvester part, and supports between the axle and platform having a bodily movement with the axle and a movement of angularity with respect to the axle to obtain clearance by locating the platform in a position out of its cutting range.

19. In a harvester thresher, in combination, a thresher part, a harvester part including a platform, connections intermediate the platform and thresher part permitting a relative movement of said parts in a plurality of angular directions obtaining traveling clearance for the platform above its cutting range, and counterbalance means for the platform, the said clearance movements being performable without removing the counterbalance means.

20. In a harvester thresher, a thresher, a harvester embodying a platform connected thereto and normally extending laterally thereof in a cutting position, means adapting the harvester for folding rearwardly in a horizontal plane to a transport position alongside the thresher, and means connected between the thresher and the harvester for elevating the platform to a position above the cutting range to obtain additional transport clearance.

21. In a harvester thresher, a thresher, a harvester foldingly connected thereto whereby the same may be swung in a horizontal plane from its normal transverse cutting position to a position folded alongside the thresher, a flexible element carried by the thresher and connected to the harvester for drawing the harvester to an elevated position to obtain additional clearance, and means to actuate the flexible element.

22. In a harvester thresher, a thresher, a harvester embodying a platform, a means hingedly connecting the harvester to the thresher to enable folding movement thereof from a normal transverse cutting position to a longitudinally disposed position alongside the thresher to obtain travel clearance, a combination grain and caster wheel supporting the outer end of the harvester which wheel embodies means so that in the cutting position of the harvester the wheel is adapted to be fixed against castering and in the folded position of the harvester is adapted to be freed to permit it to caster, means enabling the harvester platform to be elevated to a position above its cutting range to obtain additional travel clearance, and counterbalance means for the platform, said clearance obtaining movements being achieved without removing the counterbalance means.

23. A harvester thresher having a longitudinal thresher, a platform connected thereto for movement from a normal transverse horizontal cutting position about two axes to a transport clearance position alongside the thresher to locate the same in a position higher than its cutting range, a support for the platform, and a combination grain and caster wheel for the support, said wheel in all positions of the platform always being in supporting relation to the support, said wheel embodying means to enable the wheel to caster in the folded position of the platform and to be held against castering in the normal position of the platform.

24. In a harvester thresher, a longitudinal thresher, a harvester embodying a platform, means hingedly associating the harvester with the thresher to enable folding movement thereof from a normal transverse cutting position to a longitudinally disposed position alongside the thresher to obtain travel clearance, a combination grain and caster wheel supporting the outer end of the harvester which wheel embodies means so that in the cutting position of the harvester the wheel is adapted to be held against castering and in the folded position of the harvester the wheel is adapted to caster freely, and means whereby the harvester platform may be elevated from its longitudinal folded position to a position above its cutting range to obtain additional travel clearance.

25. In a harvester thresher, a longitudinal thresher, a harvester support hingedly associated with the thresher and normally disposed in transverse relation to the thresher, line levers carried by the support, a platform carried by the line levers, said support with the parts carried thereby being foldable rearwardly and horizontally from the said normal position to a position longitudinally alongside the thresher to obtain transport clearance, means whereby the line levers may be tilted upwardly to elevate the platform to obtain additional transport clearance, and a wheel in permanent supporting relation to the outer end of said support.

26. In a harvester thresher, a longitudinal thresher, a harvester support hingedly associated with the thresher and normally disposed in transverse relation to the thresher, line levers carried by the support, a platform carried by the line levers, said support with the parts carried thereby being foldable rearwardly and horizontally from the said normal position to a position longitudinally alongside the thresher to obtain transport clearance, means whereby the line levers may be tilted upwardly to elevate the platform to obtain additional transport clearance, and a wheel in permanent supporting relation to the outer end of said support said wheel further having means associated therewith to lock the same against castering in the transverse position of the support, said means being releasable to enable the said wheel to caster when the support is in its longitudinal folded position.

27. In a harvester thresher, a longitudinal thresher, a harvester support hingedly associated with the thresher and normally disposed in transverse relation to the thresher, line levers carried by the support, a platform carried by the line levers, said support with the parts carried thereby being foldable rearwardly and horizontally from the said normal position to a position longitudinally alongside the thresher to obtain transport clearance, means whereby the line levers may be tilted upwardly to elevate the platform to obtain additional transport clearance, and a wheel in permanent supporting relation to the outer end of said support said wheel in the transverse position of the support being coaxially arranged therewith and including lock means to hold the wheel against castering in the transverse position of the support, said lock means being releasable to free the wheel for castering when the support is being folded and when said support is in the folded transport position.

EDWARD A. JOHNSTON.
CLEMMA R. RANEY.
ARNOLD E. W. JOHNSON.